US008130261B2

(12) United States Patent
Trudeau et al.

(10) Patent No.: US 8,130,261 B2
(45) Date of Patent: Mar. 6, 2012

(54) SYSTEM AND METHOD FOR DYNAMICALLY CORRECTING PARALLAX IN HEAD BORNE VIDEO SYSTEMS

(75) Inventors: Tim K. Trudeau, Roanoke, VA (US); Blair R. Dobbie, Roanoke, VA (US)

(73) Assignee: Exelis, Inc., McLean, VA (US)

( * ) Notice: Subject to any disclaimer, the term of this patent is extended or adjusted under 35 U.S.C. 154(b) by 1464 days.

(21) Appl. No.: 11/545,644

(22) Filed: Oct. 10, 2006

(65) Prior Publication Data

US 2008/0084472 A1    Apr. 10, 2008

(51) Int. Cl.
H04N 13/04    (2006.01)
H04N 9/47    (2006.01)
H04N 7/18    (2006.01)

(52) U.S. Cl. .......................................... 348/53; 348/61

(58) Field of Classification Search .................... 348/51, 348/53, 61
See application file for complete search history.

(56) References Cited

U.S. PATENT DOCUMENTS

| | | | |
|---|---|---|---|
| 4,398,799 A | 8/1983 | Swift | |
| 4,752,824 A | 6/1988 | Moore | |
| 4,924,247 A | 5/1990 | Suzuki | |
| 5,173,726 A | 12/1992 | Burnham et al. | |
| 5,500,671 A | 3/1996 | Andersson et al. | |
| 5,787,313 A | 7/1998 | Compton et al. | |
| 5,815,746 A | 9/1998 | Masuda | |
| 6,307,526 B1 * | 10/2001 | Mann | 345/8 |
| 6,381,360 B1 * | 4/2002 | Sogawa | 382/154 |
| 6,560,029 B1 * | 5/2003 | Dobbie et al. | 359/631 |
| 6,590,573 B1 * | 7/2003 | Geshwind | 345/419 |
| 7,121,736 B2 * | 10/2006 | Ayame | 385/81 |
| 7,538,326 B2 * | 5/2009 | Johnson et al. | 250/370.08 |
| 2006/0010697 A1 * | 1/2006 | Sieracki et al. | 33/267 |
| 2006/0250322 A1 * | 11/2006 | Hall et al. | 345/8 |

FOREIGN PATENT DOCUMENTS

CN    2665738 Y    12/2004

OTHER PUBLICATIONS

Chinese Patent Office (SIPO), First Office Action for Patent Application No. CN 200710180936.7, January 6, 2011.
International Application Serial No. PCT/US2011/048889, International Search Report and Written Opinion mailed Nov. 2, 2011, 9 pgs.

* cited by examiner

*Primary Examiner* — Brian J Gillis
(74) *Attorney, Agent, or Firm* — RatnerPrestia

(57) ABSTRACT

A dynamically corrected parallax system includes a head borne video source for imaging an object and providing video data. A controller electronically offsets the video data provided from the head borne video source to form offset video data. A display device receives the offset video data and displays the offset video data to a user's eye. The display device is configured for placement directly in front of the user's eye as a vision aid, and the head borne video source is configured for displacement to a side of the user's eye. The offset video data corrects parallax due to horizontal and/or vertical displacement between the display device and the head borne video source.

19 Claims, 6 Drawing Sheets

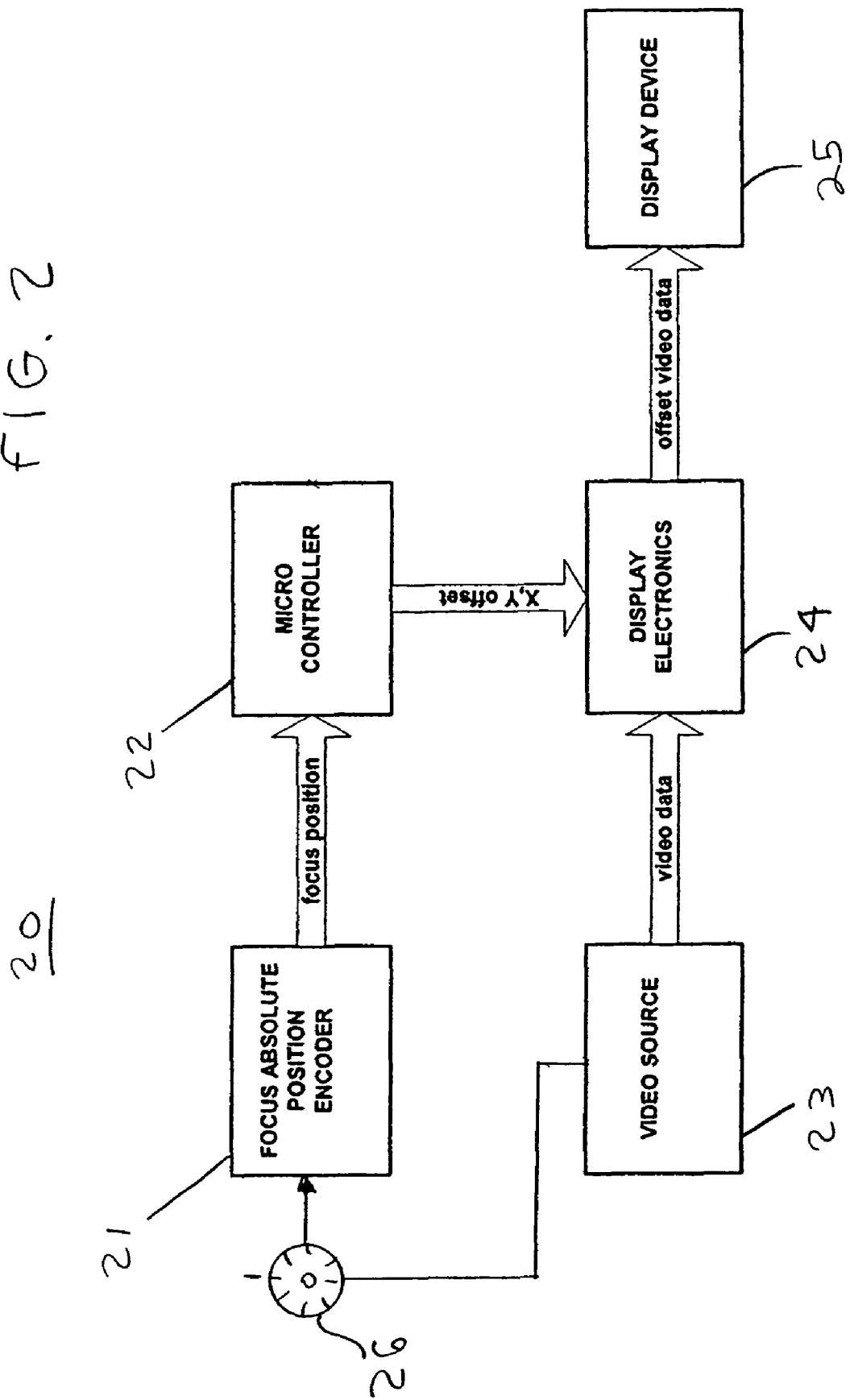

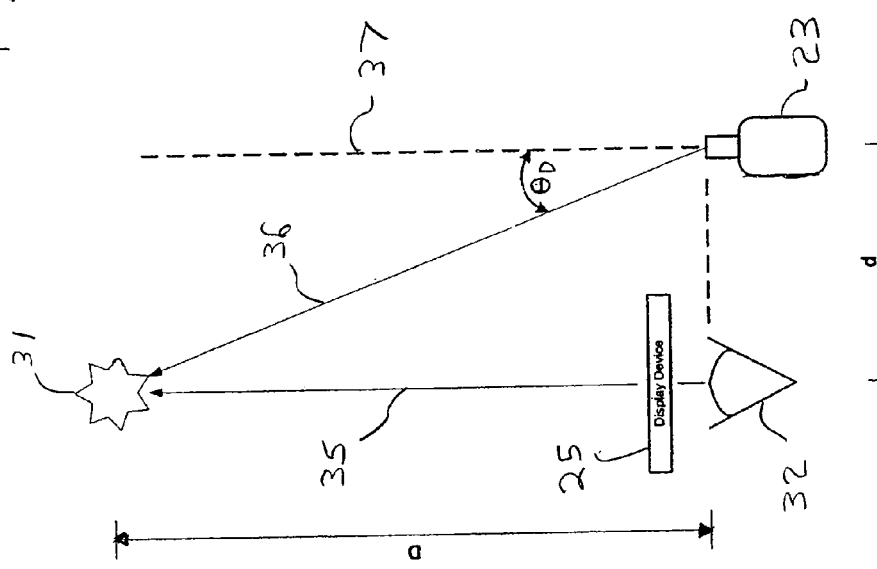

SYSTEM AND METHOD FOR DYNAMICALLY CORRECTING PARALLAX IN HEAD BORNE VIDEO SYSTEMS

FIELD OF THE INVENTION

The present invention relates, in general, to a system for parallax correction. More specifically, the present invention relates to a system and method for dynamically correcting parallax in a head mounted display (HMD), which is placed directly in front of a user's eye.

BACKGROUND OF THE INVENTION

Vision aid devices which are worn on the head are typically located directly in front of the aided eye or eyes. As these systems migrate from direct view optical paths to digital camera aids, the system configuration requires that a head mounted display (HMD) be placed directly in front of the user's aided eye, with one inch of eye relief. This placement of the HMD prevents the co-location of the camera aperture directly in front of the aided eye. The camera aperture must be moved either in front of the HMD or to one side of the HMD.

If, for example, the digital camera is placed 100 mm to the side of the optical axis of the aided eye, then a displacement is created between the aperture of the digital camera and the image display of the digital camera, the display typically centered about the optical axis of the aided eye. This displacement creates a disparity between the apparent positions of objects viewed through the camera, and the actual positions of the objects seen in object space (or real space). This offset in perceived space and object space is referred to as parallax.

FIG. 1 provides an example of parallax error. As shown, the user is viewing environment 10 through a head mounted video device. The user sees tool 12 at close range and attempts to pick up the tool. Because of parallax, the perceived position of tool 12 is incorrect. The true position of tool 12 in object space is shown by dotted tool 14.

In the case of the user viewing an object through a head mounted video device, parallax reduces the usefulness of the video system. The human psycho-visual system is unconsciously attuned to perceiving the world through its natural entrance aperture, which is the pupil in the human eye. The hand-to-eye coordination inherent in manual tasks is based on this innate property. Normal human movement tasks, such as walking and running, depend on this subconscious process. A fixed system, which is aligned to remove parallax at some fixed distance, is miss-aligned at all other distances. This is especially true when the video system is aligned to remove parallax of an object at far range and the user attempts to locate another object at close range, such as tool 12 on FIG. 1 which is located within an arms length of the user.

As will be explained, the present invention addresses the parallax problem by providing a system for dynamically realigning the video image so that the image coincides with the real world at all distances.

SUMMARY OF THE INVENTION

To meet this and other needs, and in view of its purposes, the present invention provides a dynamically corrected parallax system including a head borne video source for imaging an object and providing video data. A controller is included for electronically offsetting the video data provided from the head borne video source to form offset video data. A display device receives the offset video data and displays the offset video data to a user's eye. The display device is configured for placement directly in front of the user's eye as a vision aid, and the head borne video source is configured for displacement to a side of the user's eye. The offset video data corrects parallax due to displacement between the display device and the head borne video source.

The display device includes an X,Y array of respective columns and rows of pixels, and the offset video data includes an offset of a number of columns of pixels in the X direction of the X,Y array. The offset video data, alternatively, may include an offset of a number of rows of pixels in the Y direction of the X,Y array. The offset video data may also include an offset of a number of columns of pixels in the X direction of the X,Y array and another offset of a number of rows of pixels in the Y direction of the X,Y array.

Geometrically, the optical axis of the user's eye extends a distance of D to an object imaged by the video source, and an optical axis of the aperture of the video source extends in a direction parallel to the optical axis of the user's eye. The displacement to a side is a horizontal displacement distance of d in a Frankfort plane between the optical axis of the user's eye and the optical axis of the aperture of the video source. The offset video data is based on the horizontal displacement distance d and the distance D to the object.

Furthermore, a horizontal offset angle $\theta_D$ is formed, as follows:

$$\theta_D = t_{an}^{-1} d/D,$$

where d is a horizontal displacement distance between the optical axis of the user's eye and the optical axis of the aperture of the video source.

The display device includes an X,Y array of respective columns and rows of pixels, and the offset video data includes the following horizontal offset:

$$\text{offset}_{columns} = \#\text{Columns}/FOV_{horz} * \theta_D$$

where $\text{offset}_{columns}$ is the amount of horizontal offset in columns, $FOV_{horz}$ is the horizontal field-of-view of the video source, and #Columns is the total number of columns of the display device.

Further yet, a vertical offset angle $\theta_D$ may also be formed, where $$\phi_D = t_{an}^{-1} d'/D,$$

where d' is a vertical displacement distance between the optical axis of the user's eye and the optical axis of the aperture of the video source. The offset video data includes the following vertical offset:

$$\text{offset}_{rows} = \#\text{Rows}/FOV_{vert} * \phi_D$$

where $\text{offset}_{rows}$ is the amount of vertical offset in rows, $FOV_{vert}$ is the vertical field-of-view of the video source, and #Rows is the total number of rows in the display device.

The dynamically corrected parallax system includes a display electronics module disposed between the video source and the display device for converting the video data from the video source into digital video data. The display electronics module is configured to receive an offset command from the controller and modify the digital video data into the offset video data. The display electronics module and the controller may be integrated in a single unit. A focus position encoder may be coupled to the controller for determining a distance D to an object imaged by the video source, where the distance D is used to correct the parallax.

The display device may be a helmet mounted display (HMD), or part of a head mounted night vision goggle.

Another embodiment of the present invention includes a dynamically correcting parallax method for a head borne camera system having a video source and a display device, where the display device is configured for placement directly in front of a user's eye as a vision aid, and the video source is configured for displacement to a side of the user's eye. The method includes the steps of: (a) imaging an object, by the video source, to provide video data; (b) determining a focus distance to an object; (c) offsetting the video data to form offset video data based on the focus distance determined in step (b) and a displacement distance between the user's eye and an aperture of the video source; and (d) displaying the offset video data by the display device.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawings. Included in the drawing are the following figures:

FIG. 2 is a block diagram of a system for dynamically correcting parallax in a head borne video system, in accordance with an embodiment of the present invention;

FIG. 3A is a top view of an object as viewed by a user and imaged by a video camera, where a display of the image is displaced from the aperture of the camera by a horizontal displacement distance;

DETAILED DESCRIPTION OF THE INVENTION

Figure 1:
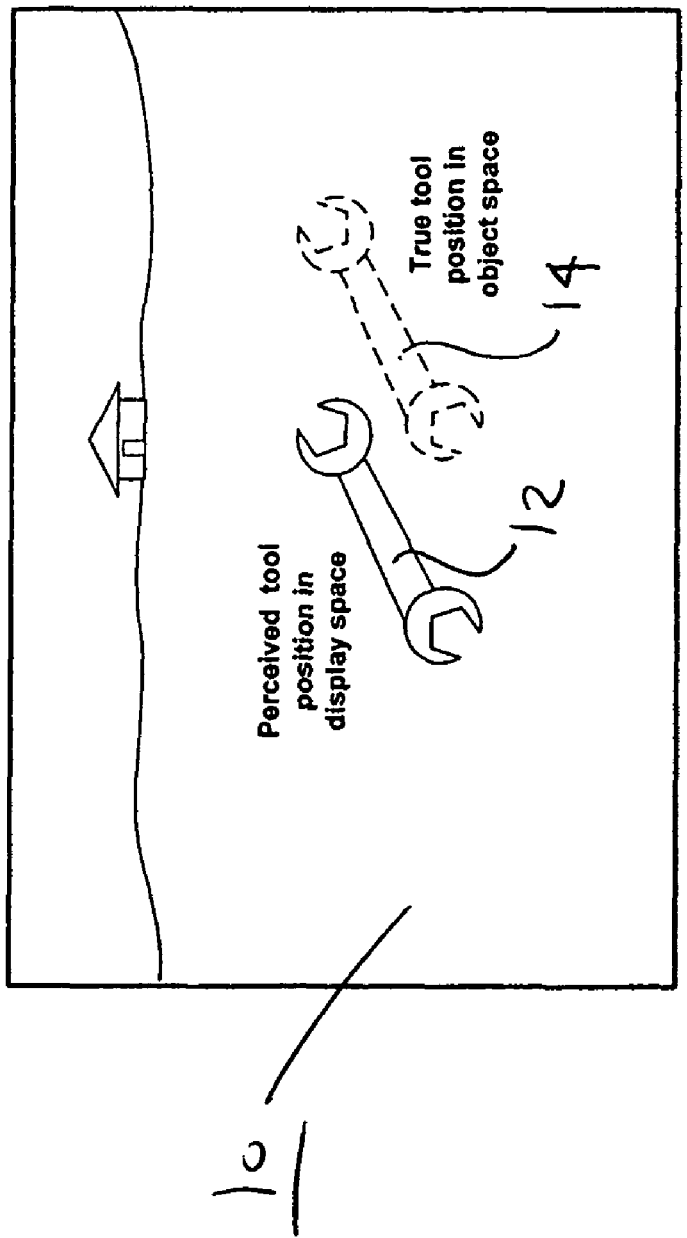
FIG. 1 depicts a geometry of a parallax offset between an object as imaged by a camera and the same object as seen in object space by a viewer.

As will be explained, the present invention dynamically realigns the video image so that the image coincides with the real world at all distances. To do this, the present invention determines the range to the object of interest, so that dynamic alignment may be accomplished based on the determined range. In one embodiment, the invention uses an absolute position of the camera's focus mechanism (or angular orientation of a manual focus knob) to determine the distance to the user's object-of-interest and then applies an appropriate amount of parallax correction to the image shown on the user's display. In this manner, the apparent location of an object-of-interest is correctly perceived at its true position in object space.

In one embodiment of the invention, the video is provided to the user on a digital display device, such as a LCD or LED display. These displays consist of an array of rows and columns of pixels. By controlling the timing of the video data sent to the display, the present invention induces an offset in the image as the image is displayed to the user. By shifting the image in display space, the present invention removes the disparity between the apparent position of an object and its actual position in object space.

A consequence of shifting the image on the display is lost rows and/or columns of pixels in the direction of the image shift. Rows and/or columns of pixels on the opposite edges of the display show arbitrary intensity values, because (assuming a one-to-one relationship in pixel resolution between the camera and the display) these pixels are no longer within the field-of-view of the camera and, therefore, do not provide image data. Thus, shifting the image introduces a reduction in the effective user's field-of-view, because of the reduced usable image size. This negative effect may be minimized, however, by setting the camera pointing angle for convergence at a distance much closer than the far field.

Referring next to FIG. 2, there is shown a system for dynamically correcting parallax in a head borne video system, generally designated as 20. System 20 includes video source 23 providing video data to display electronics module 24, the latter forming digital pixel data for viewing on display device 25. Also included in system 20 is a focus position encoder, designated as 21, for providing focus position data to microcontroller 22. The focus position encoder 21 encodes, as shown, the orientation of focus knob 26 disposed on video source 23. Microcontroller 22 converts the focus position data received from the position encoder 21 into X,Y offset control signals, as will be explained later. The X,Y offset control signals are provided to display electronics 24 which, in turn, provides the offset video data for viewing on display device 25.

It will be appreciated that video source 23 may be any camera device configured to be placed on the side of the optical axis of a user's eye. In the embodiment shown in FIG. 2, video source 23 includes manual focus knob 26 which allows the user to adjust the lens of the video camera to focus on an object-of-interest. Display device 25 may be any display which is configured to be placed about the optical axis of the user's eye. The display device provides an offset pixel image of the image represented by the video data received from video source 23. The X,Y array of pixels displayed on display device 25 and the video data provided by video source 23 may have a one-to-one correspondence, or may have any other relationship, such as a correspondence resulting from a reduced resolution display versus a high resolution video camera.

As another embodiment, focus knob 26 may be controlled by a motor (not shown) to allow for a zoom lens operation of video source 23. In this embodiment, focus position encoder 21 may determine the focal length to an object-of-interest by including a zoom lens barrel. A focal length detecting circuit may be included to detect and output the focal length of the zoom lens barrel. As a further embodiment, video source 23 may include a range finder, such as an infrared range finder, which may focus an infrared beam onto a target and receive a reflected infrared beam from the target. A position sensitive device included in focus position encoder 21 may detect the displacement of the reflected beam and provide an encoded signal of the range, or position of the target.

The microcontroller may be any type of controller having a processor execution capability provided by a software program stored in a medium, or a hardwired program provided by an integrated circuit. The manner in which microcontroller 22 computes the X,Y offset control signals is described next.

Figure 3B:
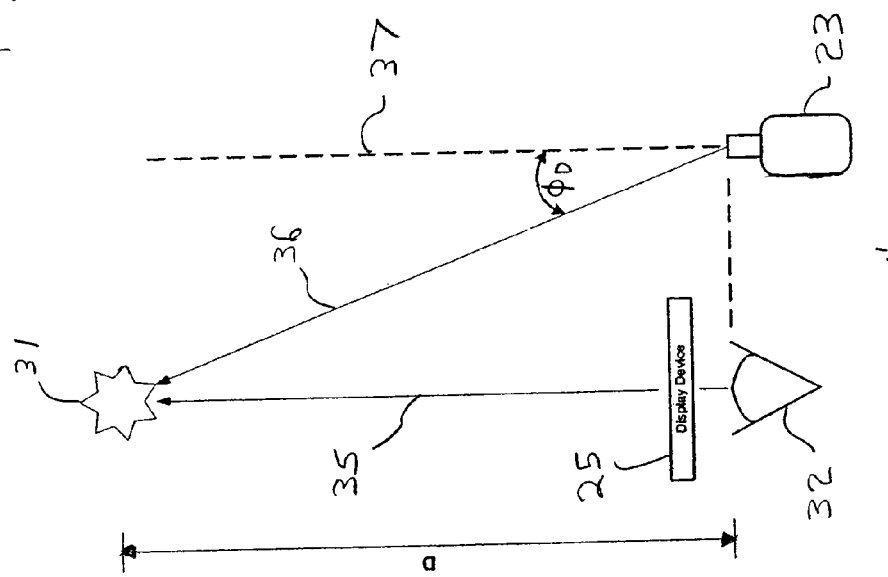
FIG. 3B is a side view of an object as viewed by a user and imaged by a video camera, where a display of the image is displaced from the aperture of the camera by a vertical displacement distance.

Referring to FIGS. 3A and 3B, camera 23 is shown offset by a displacement distance from a user's eye 32. FIGS. 3A and 3B are similar to each other, except that camera 23 is oriented to a horizontal, right side of a user's eye 32 by a horizontal displacement distance of d in FIG. 3A, whereas it is oriented to a vertical side of (above or below) the user's eye by a vertical displacement distance of d' in FIG. 3B. The horizontal displacement distance and/or the vertical displacement distance is typically in the vicinity of 100 millimeters. The camera 23 has an optical axis designated as 37 and the user's eye has an optical axis designated as 35. Both optical axes are shown parallel to each other.

The user is aided in the viewing of object 31 by way of display device 25. As shown in FIG. 3A, camera 23 is imaging object 31 at a horizontal offset angle of $\theta_D$. In FIG. 3B, however, camera 23 is imaging object 31 at a vertical offset angle of $\phi_D$. In both figures, object 31 is displayed as a pixel image on display device 25 for viewing by the user. The focal distance, which may be adjustable, is the distance D between the user's eye and the object-of-interest 31.

Using FIG. 3A, a method for calculating the X offset control signal by microcontroller 22 is exemplified below. In this example, the units of the X offset are in horizontal pixels, which may be equivalent to columns of pixels on video display 25. For the purpose of this example, it is assumed that the horizontal displacement distance d is 103 mm; the field-of-view (FOV) of camera 23 is 40 degrees along the horizontal (HFOV) axis; the horizontal resolution of display device 25 is 1280 pixels; the optical axis of camera 23 is parallel to the optical axis of the unaided eye 32; the aperture of the camera is on the viewer's Frankfort plane, in line with the unaided eye; and the object-of-interest 31 is at a focal distance of D.

The horizontal offset angle $\theta_D$ is given by equation (1) as follows $$\theta_D = t_{an}^{-1} d/D \quad \text{(Eq. 1)}$$

The correction factor '$C_{horz}$' (for a 40 degree FOV and a 1280 pixel horizontal display resolution) is given by equation 2, in units of columns per degree, as follows $$C_{horz} = \#\text{Columns}/FOV_{horz} \quad \text{(Eq. 2)}$$
$$= 1280/40$$
$$= 32 \text{ columns/degree}$$

Here, #columns is the total number of columns in the digital display, or 1280 columns (in this example). The image shift on the display device, or the amount of offset-in-columns, is given by equation 3 below, where $\theta_D$ is the horizontal offset angle between the camera's line of sight 36 and the camera's optical axis 37.

$$\text{offset}_{columns} = C_{horz} * \theta_D \quad \text{(Eq. 3)}$$

In a similar manner, using FIG. 3B, a method for calculating the Y offset control signal by microcontroller 22 is exemplified below. In this example, the units of the Y offset are in vertical pixels, which may be equivalent to rows of pixels on video display 25. For the purpose of this example, it is assumed that the vertical displacement distance d' is 103 mm; the field-of-view (FOV) of camera 23 is 30 degrees along the vertical (VFOV) axis; the vertical resolution of display device 25 is 1024 pixels; the optical axis of camera 23 is parallel to the optical axis of the unaided eye 32; the aperture of the camera is in a vertical line with the unaided eye; and the object-of-interest 31 is at a focal distance of D.

The vertical offset angle $\phi_D$ is given by equation (4) as follows $$\phi_D = t_{an}^{-1} d'/D \quad \text{(Eq. 4)}$$

The correction factor $C_{vert}$ (for a 30 degree vertical FOV and a 1024 pixel vertical display resolution) is given by equation 5, in units of rows per degree, as follows $$C_{vert} = \#\text{Rows}/FOV_{vert} \quad \text{(Eq. 5)}$$
$$= 1024/30$$
$$= 34 \text{ rows/degree}$$

Here, #rows is the total number of rows in the digital display, or 1024 rows (in this example). The image shift on the display device, or the amount of offset-in-rows, is given by equation 6 below, where $\phi_D$ is the vertical offset angle between the camera's line of sight 36 and the camera's optical axis 37.

$$\text{Offset}_{rows} = C_{vert} * \phi_D \quad \text{(Eq. 6)}$$

Figure 4:
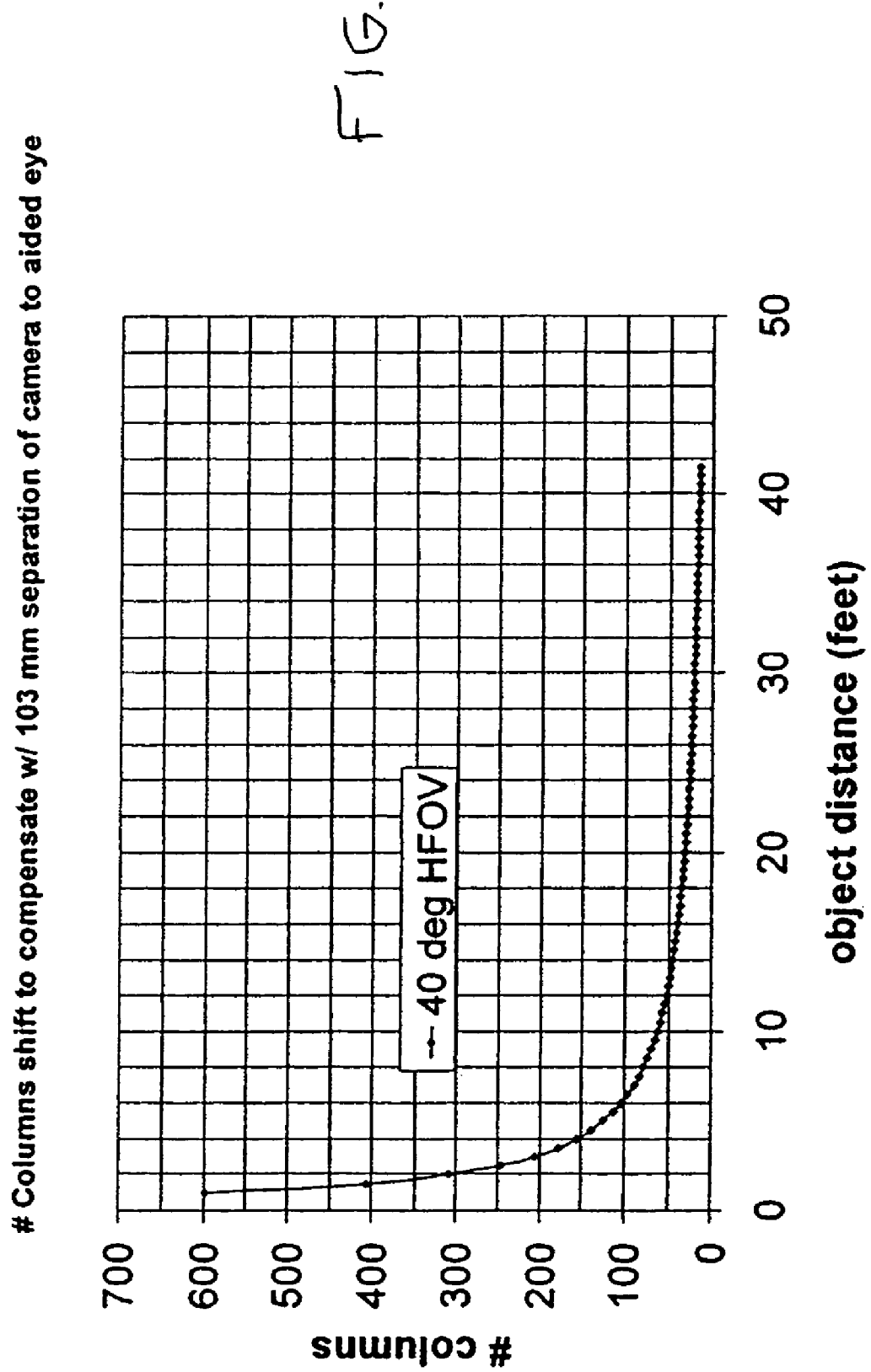
FIG. 4 is a plot of the number of columns required to be shifted on a display as a function of viewing distance to the object-of-interest, in accordance with an embodiment of the present invention.

Referring next to FIG. 4, there is shown a plot of the offset-in-#columns vs the distance between the observer (the user's eye) and the observed object (object-of-interest). More specifically, FIG. 4 plots the horizontal image offset, in number-of-columns, required to compensate for the parallax induced by a 103 mm horizontal displacement between an observer and the video camera. For a camera located to the right of the aided eye, the parallax correcting image shift in the display is towards the right.

The plot shown in FIG. 4 is for a camera/HMD system with a matched HFOV of 40 degree. As can be seen, the amount of image shift required to remove the parallax increases nonlinearly as the observer focuses to shorter and shorter distances. At a focus distance of 2 feet, 25% of the viewable area of a SXGA high resolution display will be shifted out of view, thereby reducing the effective display HFOV by approximately 25%. To avoid the loss of HFOV at close focus distances, the optical axis of the camera may be biased to the left, thereby reducing the horizontal offset angle $\theta_D$.

A similar plot to the plot shown in FIG. 4 may be made for an offset-in-#rows vs the distance between the observer (the user's eye) and the observed object (object-of-interest).

Figure 5:
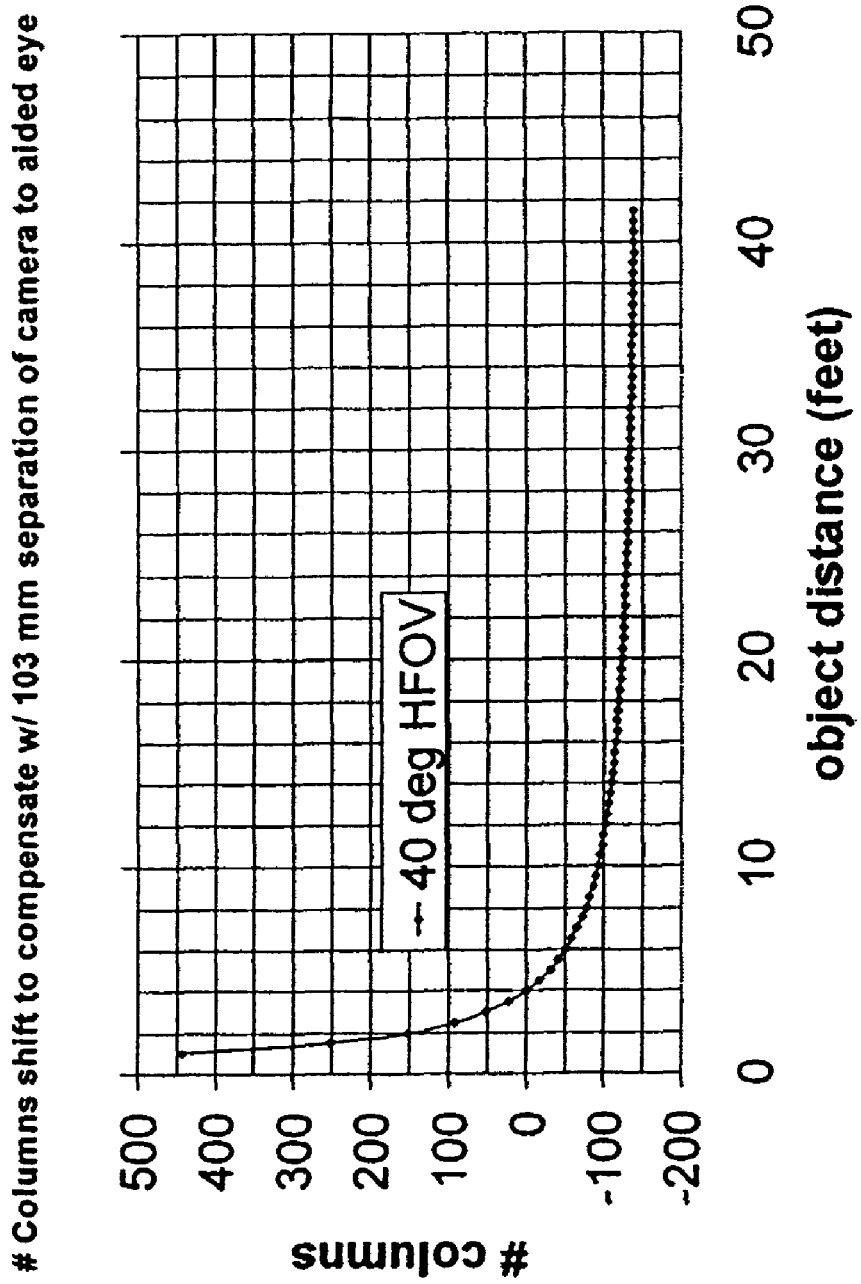
FIG. 5 is a plot of the number of columns required to be shifted on a display as a function of viewing distance to the object-of-interest, with a bias angle introduced in the imaging angle of the camera, in accordance with an embodiment of the present invention.

Lastly, FIG. 5 shows a resulting horizontal image offset in #columns with the same assumptions as those made for FIG. 4, except that a bias angle of 4.8 degrees has been introduced. At this camera angle, the display offset required to remove parallax is reduced to zero at 4 feet. At 2 feet, the required offset is 152 columns, or 12% of the HFOV, as compared to 24% of the HFOV in FIG. 4. Beyond a distance of 4 feet, the display offset becomes negative, which means that the video image must be shifted toward the opposite edge, or end of the display. This camera angle thus introduces a parallax error with an opposite sign. For a focal distance of 10 feet, the horizontal display offset required to compensate for parallax is −93 columns, or 7.2% of the HFOV. At 40 feet distance, the horizontal display offset is 139 columns, or 11% of the HFOV.

The embodiments described above may be used by any head borne camera system, including a head mounted night vision goggle and a head mounted reality mediator device.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A dynamically corrected parallax system comprising
a head borne video source for imaging an object and providing video data,
a controller for electronically offsetting the video data provided from the head borne video source to form offset video data, and
a display device for receiving the offset video data and displaying the offset video data to a user's eye,
wherein the display device is configured for placement directly in front of the user's eye as a vision aid, and the head borne video source is configured for displacement to a side of the user's eye,
the offset video data corrects parallax due to displacement between the display device and the head borne video source,
an optical axis of the user's eye extends a distance of D to an object imaged by the head borne video source,
an optical axis of an aperture of the head borne video source extends in a direction parallel to the optical axis of the user's eye,
the displacement to a side is a horizontal displacement distance of d in a Frankfort plane between the optical axis of the user's eye and the optical axis of the aperture of the head borne video source, and
the offset video data is based on the horizontal displacement distance d and the distance D to the object.

2. The dynamically corrected parallax system of claim 1 wherein
the display device includes an X,Y array of respective columns and rows of pixels, and
the offset video data includes an offset of a number of columns of pixels in the X direction of the X,Y array.

3. The dynamically corrected parallax system of claim 1 wherein
the display device includes an X,Y array of respective columns and rows of pixels, and
the offset video data includes an offset of a number of rows of pixels in the Y direction of the X,Y array.

4. The dynamically corrected parallax system of claim 1 wherein
the display device includes an X,Y array of respective columns and rows of pixels, and
the offset video data includes an offset of a number of columns of pixels in the X direction of the X,Y array and another offset of a number of rows of pixels in the Y direction of the X,Y array.

5. The dynamically corrected parallax system of claim 1 wherein a horizontal offset angle $\theta_D$ is formed, as follows:

$$\theta_D = t_{an}^{-1} d/D,$$

where d is a horizontal displacement distance between the optical axis of the user's eye and the optical axis of the aperture of the head borne video source, and
the display device includes an X,Y array of respective columns and rows of pixels, and
the offset video data includes the following horizontal offset:

$$\text{offset}_{columns} = \#Columns/FOV_{horz} * \theta_D$$

where $\text{offset}_{columns}$ is the amount of horizontal offset in columns,
$FOV_{horz}$ is the horizontal field-of-view of the head borne video source, and
Columns is the total number of columns in the display device.

6. The dynamically corrected parallax system of claim 1 wherein
a vertical offset angle $\theta_D$ is formed, as follows:

$$\theta_D = t_{an}^{-1} d'/D,$$

where d' is a vertical displacement distance between the optical axis of the user's eye and the optical axis of the aperture of the head borne video source; and
the display device includes an X,Y array of respective columns and rows of pixels, and
the offset video data includes the following vertical offset:

$$\text{offset}_{rows} = \#Rows/FOV_{vert} * \phi_D$$

where $\text{offset}_{rows}$ is the amount of vertical offset in rows,
$FOV_{vert}$ is the vertical field-of-view of the head borne video source, and
Rows is the total number of rows in the display device.

7. The dynamically corrected parallax system of claim 1 including
a display electronics module disposed between the video source and the display device for converting the video data from the video source into digital video data,
wherein the display electronics module is configured to receive an offset command from the controller and modify the digital video data into the offset video data.

8. The dynamically corrected parallax system of claim 7 wherein
the display electronics module and the controller are integrated in a single unit.

9. The dynamically corrected parallax system of claim 1 including
a focus position encoder coupled to the controller for determining a distance D to an object imaged by the head borne video source,
wherein the distance D is used to correct the parallax.

10. The dynamically corrected parallax system of claim 1 wherein the display device is a helmet mounted display (HMD).

11. The dynamically corrected parallax system of claim 1 wherein
the display device and the head borne video source are part of a head mounted night vision goggle.

12. In a head borne camera system having a video source and a display device, wherein the display device is configured for placement directly in front of a user's eye as a vision aid, and the video source is configured for displacement to a side of the user's eye, a method of dynamically correcting parallax comprising the steps of:
(a) imaging an object, by the video source, to provide video data;
(b) determining a focus distance D to an object;
(c) offsetting the video data to form offset video data based on the focus distance determined in step (b) and a horizontal displacement distance d in a Frankfort plane, between the user's eye and the aperture of the video source; and
(d) displaying the offset video data by the display device;
wherein offsetting the video data corrects the parallax by the following offset:

$$\text{offset}_{columns} = \#Columns/FOC_{horz} * \theta_D$$

where $\text{offset}_{columns}$ is the amount of horizontal offset in columns, $FOV_{horz}$ is the horizontal field-of-view of the head borne video source, and #Columns is the total number of columns in the display device, and $$\theta_D = \tan^{-1} d/D.$$

13. The method of claim 12 wherein the video data is used to form an X,Y array of respective columns and rows of pixels, and
    step (c) includes moving the video data by a number of columns of pixels in the X direction of the X,Y array to form the offset video data.

14. The method of claim 12 wherein the video data is used to form an X,Y array of respective columns and rows of pixels, and
    step (c) includes moving the video data by a number of rows of pixels in the Y direction of the X,Y array to form the offset video data.

15. The method of claim 12 wherein the video data is used to form an X,Y array of respective columns and rows of pixels, and
    step (c) includes moving the video data by a number of columns of pixels in the X direction and a number of pixels in the Y direction of the X,Y array to form the offset video data.

16. The method of claim 12 wherein
step (a) includes providing analog video data, and
step (c) includes converting the analog video data into digital video data prior to offsetting the video data.

17. The method of claim 12 wherein
the video source is configured for displacement to a right side of the user's eye, and
step (c) includes shifting an image of the object to the right side of the display device.

18. The method of claim 17 including the step of:
biasing the aperture of the video source toward an optical axis of the user's eye to minimize an amount of offset produced in step (c).

19. The method of claim 12 wherein
step (b) includes encoding an angular orientation of a focus knob disposed on the video source to determine the focus distance to the object.

* * * * *